United States Patent
Han

(10) Patent No.: US 12,346,681 B2
(45) Date of Patent: Jul. 1, 2025

(54) FIRMWARE UPDATING IN PCIe TYPE APPARATUSES

(71) Applicant: Yangtze Memory Technologies Co., Ltd., Hubei (CN)

(72) Inventor: Peian Han, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 161 days.

(21) Appl. No.: 18/090,241

(22) Filed: Dec. 28, 2022

(65) Prior Publication Data

US 2023/0266963 A1 Aug. 24, 2023

(30) Foreign Application Priority Data

Feb. 18, 2022 (CN) .......................... 202210153211.3

(51) Int. Cl.
*G06F 8/65* (2018.01)
*G06F 13/16* (2006.01)

(52) U.S. Cl.
CPC ............ *G06F 8/65* (2013.01); *G06F 13/1668* (2013.01)

(58) Field of Classification Search
None
See application file for complete search history.

(56) References Cited

U.S. PATENT DOCUMENTS

| | | | |
|---|---|---|---|
| 9,940,123 B1* | 4/2018 | Ayoub | G06F 13/4295 |
| 2011/0276807 A1* | 11/2011 | Shin | G06F 8/65 |
| | | | 713/189 |
| 2012/0072734 A1* | 3/2012 | Wishman | G06F 21/64 |
| | | | 713/189 |
| 2015/0121355 A1* | 4/2015 | Chang | G06F 8/654 |
| | | | 717/168 |
| 2018/0101376 A1* | 4/2018 | Olarig | G06F 8/63 |
| 2018/0165082 A1* | 6/2018 | Batchelor | H04L 67/10 |
| 2020/0218527 A1* | 7/2020 | Ganesan | G06F 8/65 |
| 2020/0218545 A1* | 7/2020 | Ganesan | G06F 9/4411 |
| 2020/0328180 A1* | 10/2020 | Cheng | H01L 25/18 |

* cited by examiner

*Primary Examiner* — Qing Chen
(74) *Attorney, Agent, or Firm* — Oblon, McClelland, Maier & Neustadt, L.L.P.

(57) ABSTRACT

Embodiments of the present disclosure provide a firmware updating method, an apparatus and a data system. The firmware updating method is applied to the first apparatus, the first apparatus contains at least one PCI configuration space for configuring functions for the first apparatus, and the method specifically includes: configuring firmware updating capability in the first PCI configuration space in the at least one PCI configuration space, and updating the first firmware to the first apparatus based on the firmware updating capability.

19 Claims, 16 Drawing Sheets

FIRMWARE UPDATING IN PCIe TYPE APPARATUSES

CROSS-REFERENCE OF RELATED APPLICATIONS

The present application claims the benefit of priority to Chinese Application No. 202210153211.3, filed on Feb. 18, 2022, the content of which is incorporated herein by reference in its entirety.

FIELD OF THE DISCLOSURE

The present disclosure relates to the field of memory devices, in particularly to a firmware updating method, an apparatus, and a data system.

BACKGROUND

In the memory technologies, one or more communication interfaces may be provided in a memory system for communicating with one or more components in the host device. Interfaces that are applied broadly may be PCIe (Peripheral Component Interconnect express) interfaces. As the functions of PCIe interface being improved or modified, corresponding firmwares in the memory system need corresponding upgrading. However, upgrading manner used at present is limited by tools provided by the manufacturers, and upgrading firmwares is complex, which is not in favor of practical test and use by operation and maintenance staff.

SUMMARY OF THE DISCLOSURE

Embodiments of the present disclosure provide a method, an apparatus and a data system for firmware updating as well as a convenient and fast firmware updating manner to implement firmware upgrading in PCIe type apparatuses conveniently and quickly without driver software tools.

In order to achieve the above-mentioned object, the technical solution of the present disclosure is implemented as follows.

In the first aspect, the present disclosure provides a firmware updating method applied to a first apparatus with at least one external component interconnect PCI configuration space, the method comprising:
configuring firmware updating capability in a first PCI configuration space in the at least one PCI configuration space; and
updating a first firmware to the first apparatus based on the firmware updating capability.

In the second aspect, the present disclosure further provides a first apparatus, the first apparatus comprises a processor and at least one external component interconnect PCI configuration space, wherein
the processor is configured to configure firmware updating capability in the first PCI configuration space in the at least one PCI configuration space, and update the first firmware to the first apparatus based on the firmware updating capability.

In the third aspect, an embodiment of the present disclosure further provides a data system,
the data system comprises a host and a first apparatus; wherein the first apparatus contains at least one external component interconnect PCI configuration space and communicates with the host via at least one of the following interfaces: PCI interface, PCI-X interface, and PCIe interface;

the host sends a configuration request to the first apparatus;
the first apparatus receives the configuration request via the first interface and configures the firmware updating capability in the first PCI configuration space in the at least one PCI configuration space; the first interface is one of PCI interface, PCI-X interface and PCe interface;
the host sends one or more write commands containing data related to the first firmware to the first apparatus;
the first apparatus receives the one or more write commands via the first interface and writes data related to the first firmware to respective locations of the first data structure corresponding to the firmware updating capability; and upon receiving the update command, update the first firmware to the first apparatus based on the update command.

Embodiments of the present disclosure provide a firmware updating method, an apparatus and a data system. The firmware updating method is applied to the first apparatus with at least one PCI configuration space, and the method comprises: configuring firmware updating capability in the first PCI configuration space in the at least one PCI configuration space, and updating the first firmware to the first apparatus based on the firmware updating capability. With the firmware updating method and apparatus provided in the present disclosure, by defining new firmware updating capability in the PCI configuration space of the first apparatus to implement updating of the first firmware with the firmware updating capability, it is possible to conveniently and quickly upgrade firmware without driver software tools. And the firmware updating method provided in the present disclosure may be applied to different types of apparatuses with PCI configuration spaces, thereby resulting in a certain degree of versatility.

BRIEF DESCRIPTION OF DRAWINGS

In the figures drawn not necessarily to scale, same reference numerals may describe similar parts in different views. Same numerals with different character suffixes may represent different instances of similar parts. The accompanying drawings illustrate various embodiments discussed in the present document in general by example rather than limitation.

DETAILED DESCRIPTION

Figure 1:
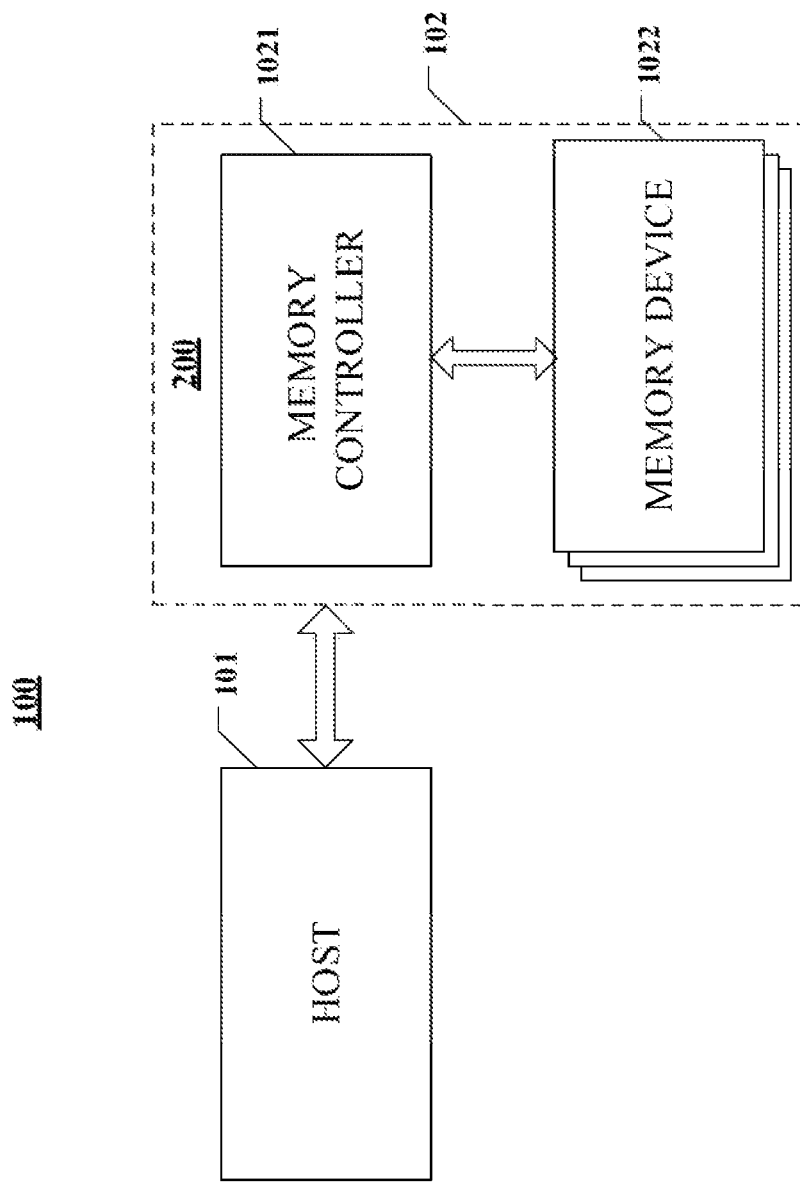
FIG. 1 is a structure diagram of a data system provided in an embodiment of the present disclosure.

Embodiments of the present disclosure will be described in greater detail below with reference to drawings. Other embodiments that may serve as variants of any disclosed embodiments may be formed by differently configuring or arranging elements and features in embodiments of the present disclosure. Therefore, embodiments of the present disclosure are not limited to embodiments described in the description. In contrast, the described embodiments are provided to make embodiments of the present disclosure thorough and complete and to convey the scope of embodiments of the present disclosure fully to those skilled in the art. It is noted that references to "embodiment" and "another embodiment" or the like do not necessarily refer to only one embodiment, and different references to any such phrases do not refer to the same embodiment. It should be understood that although terms "first", "second' and "third" etc. may be used herein to identify various elements, these elements are not limited by these terms. These terms are used to distinguish one element from another element with the same or similar name. Therefore, a first element in one embodiment may also be referred to as a second or third element in another embodiment without departing from the spirit and scope of embodiments of the disclosure.

The accompanying drawings are not necessarily drawn to scale and may be in enlarged scale to clearly illustrate features of embodiments in certain cases. When an element is described as connected or coupled to another element, it should be understood that the former may be directly connected or coupled to the latter, or may be electrically connected or electrically coupled to the latter via one or more intermediate elements therebetween. It should be further understood that when an element is described as "between" two elements, the element may be the only one element between two elements, or there may be one or more intermediate elements.

Terms as used herein are only for the purpose of describing certain embodiments rather than limiting the present disclosure. Singular forms as used herein are intended to include plural forms unless otherwise stated in the context. The articles "a" and/or "an" as used in embodiments of the present disclosure and the appended claims should be explained as "one or more" unless stated otherwise or clearly understood as singular forms from context. It should be further understood that terms "include", "including", "comprise" and "comprising" as used in embodiments of the present disclosure means the presence of the elements but do not exclude the presence or addition of one or more other elements. The term "and/or" as used in embodiments of the present disclosure includes any and all combinations of one or more related listed items. Unless otherwise defined, all terms related to technology and science as used in embodiments of the present disclosure have the same meanings as understood by those of ordinary skill in the art in view of embodiments of the present disclosure. It should be further understood that unless clearly defined in embodiments of the present disclosure, terms should be explained as having meanings consistent with meanings in the environments of embodiments of the present disclosure and related technology as defined in common dictionaries rather than being explained in an ideal manner or over formally.

In the following description, many specific details are set forth to provide an understanding of the present disclosure. However, the present disclosure may be practiced without some or all of the specific details. In other cases, known processing structures and/or processing are not described in detail to avoid obscuring the present disclosure unnecessarily. It should be further understood that in certain cases, unless otherwise stated, it should be obvious to those skilled in the art that features or elements described with respect to one embodiment may be used separately or in combination with other features or elements in another embodiment. In the following, embodiments of the present disclosure will be described in detail with reference to accompanying drawings. The following description focuses on details to facilitate to understand embodiments of the present disclosure. Well known technical details may be omitted to avoid obscuring features and aspects of embodiments of the present disclosure unnecessarily.

Embodiments of the present disclosure relate to a method, an apparatus and a data system in which a host can update firmwares of the memory system conveniently and quickly. The main idea may be described as follows: when an apparatus containing memory system or other apparatus has a configuration space, the configuration space is used to configure firmware updating capability, and then the firmware updating capability is used to update firmwares to be updated into the apparatus containing the memory system or other apparatus.

The embodiments of the present disclosure will be descried in more detail below with respect to accompany drawings and specific embodiments.

FIG. 1 is a structure diagram of a data system provided in an embodiment of the present disclosure. The data system 100 may include a host 101 and one or more first apparatus 102, and the host 101 communicates with the one or more first apparatus 102 via a communication interface. Part of the one or more first apparatuses 102 may contain memory system 200. The host 101 and/or the memory system 200 may be included in various products such as Internet of Things (IoT) devices such as refrigerators or other devices, sensors, motors, mobile communication devices, automobiles, unmanned cars for supporting processing, communication or control of products.

Figure 2:
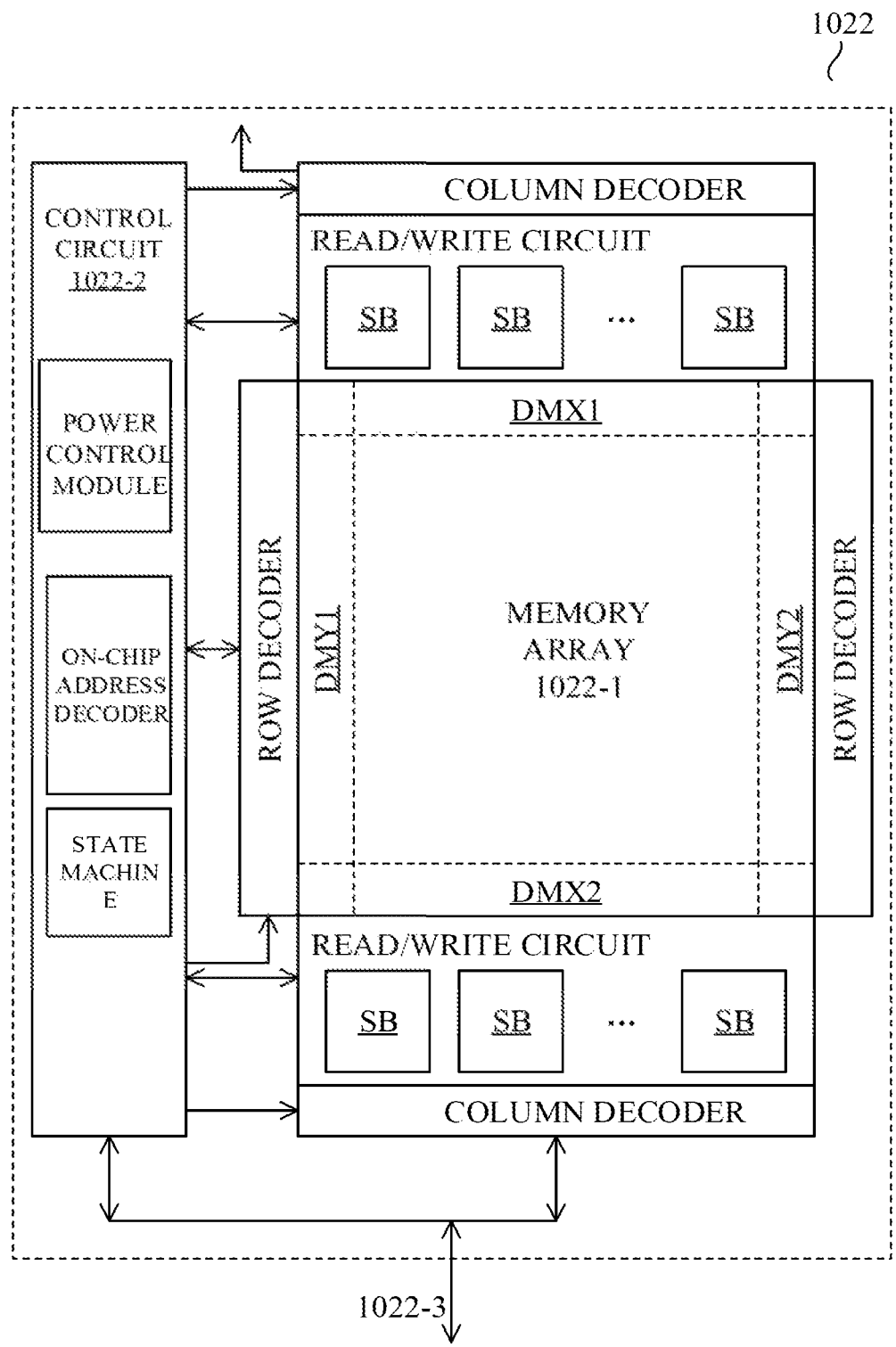
FIG. 2 is a structure diagram of a memory device provided in an embodiment of the present disclosure.
Figure 3:
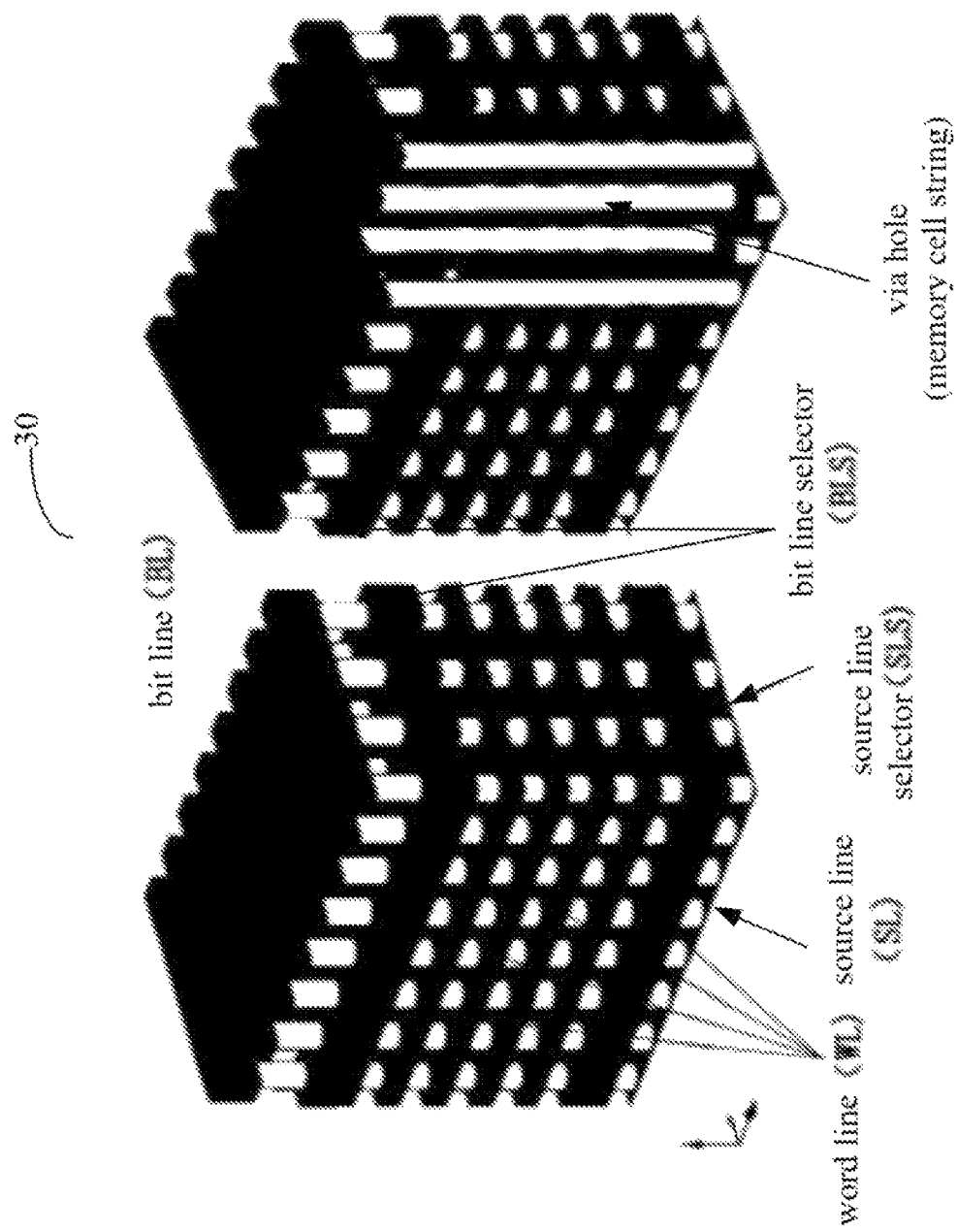
FIG. 3 is a perspective view of a part of an example solution of a single-piece 3D memory array provided in an embodiment of the present disclosure.

The memory system 200 may include a memory controller 1021 and one or more memory devices 1022. As shown in FIG. 2, a memory device 1022 contains a memory array 1022-1 of a plurality of separate memory dies stacked and a periphery control circuit 1022-2 coupled to the memory array 1022-1, wherein the memory array 1022-1 may be stacked in two dimensions or three dimensions (3D), such as 2D or 3D stack of NAND dies. One structure that may be implemented may be shown in FIG. 3. FIG. 3 shows a perspective view of a part of an example solution of a single-piece 3D memory array provided in an embodiment of the present disclosure.

Figure 4:
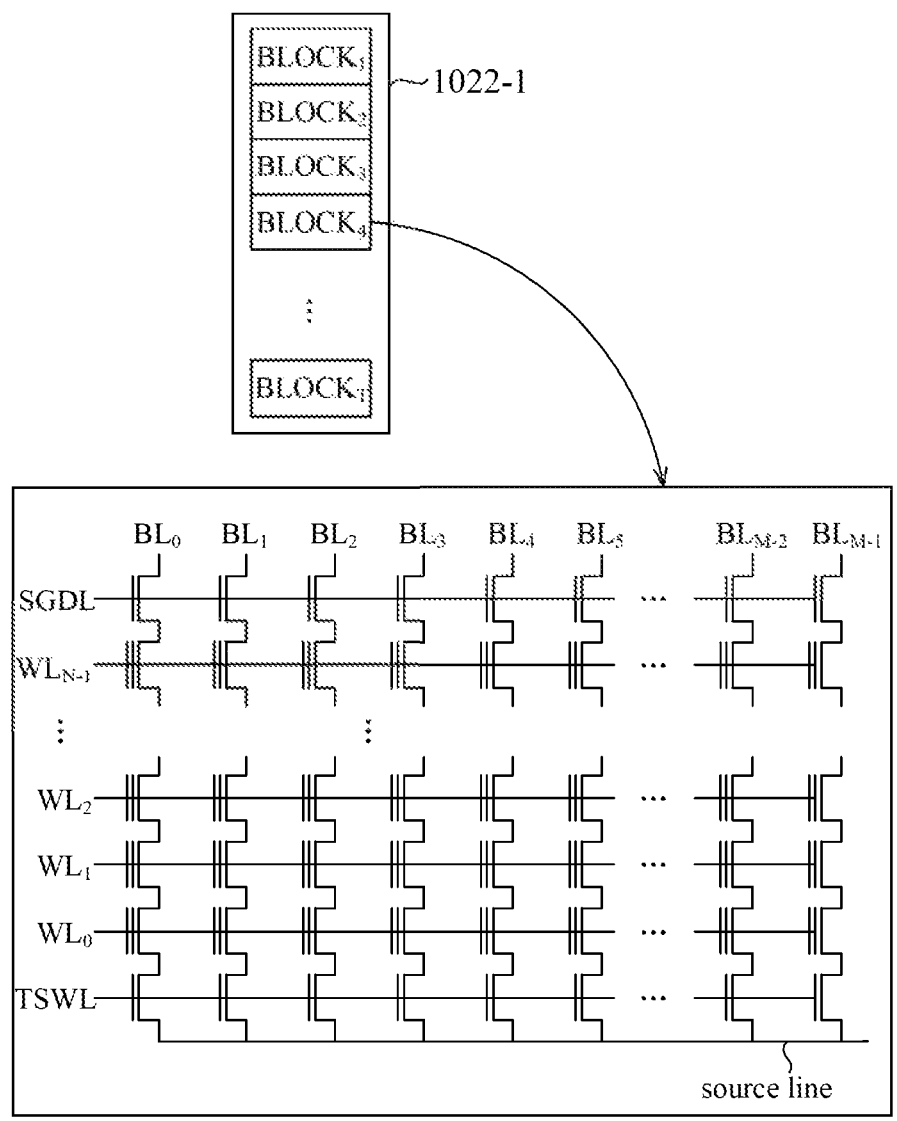
FIG. 4 is a structure diagram of a memory cell array provided in an embodiment of the present disclosure.

It should be noted that the memory array 1022-1 in the memory device 1022 has a plurality of memory blocks with an example structure as shown in FIG. 4. The memory array is divided into a plurality of memory blocks BLOCK1-BLOCKT, wherein T is an integer and generically a large number. Each memory block contains a group of NAND strings that are accessed via bit lines BL0-BLM−1 and a group of common word lines WL0-WLN−1, wherein M and N are both integers greater than 1. One terminal of the NAND string is connected to a corresponding bit line through a top select gate SGD (controlled by a top select gate line SGDL), and another terminal of the NAND string is connected to a source line through a bottom select gate SGS (controlled by a bottom select gate line SGSL). Each memory block is divided into a plurality of pages. In some embodiments, a memory block is a smallest unit for erasing, and a page is a smallest unit for programming. In some other embodiments, other units for erasing, programming may also be used. In an example, the physical structure of the memory cell in the memory array shown in FIG. 4 does not limit the scope of the present disclosure.

In the present disclosure, the memory array shown in FIG. 4 may be arranged in a 3D QLC structure. It should be noted that other structure arrangements do not limit the scope of the present disclosure.

FIG. 3 shows a memory block therein. With reference to FIG. 3, the memory block 30 contains a plurality of layers stacked on the substrate (not shown) and parallel to the surface of the substrate. FIG. 3 shows four word lines (WL) on four layers denoted as WL0 to WL3. The memory block 30 is further provided with a plurality of vias perpendicular to the word lines. The intersection between one word line and one via forms a memory cell, and therefore a via may be referred to as a memory cell string. It will be understood by one skilled in the art that, the number of word lines and the number of memory cell strings in memory block 30 are not limited to specific values. For example, the memory block 30 may include 64 word lines that intersect with a memory cell string, forming 64 memory cells along the memory cell string. As another example, the memory block 30 may include hundreds of thousands, millions or even more memory cell strings, and one word line may include millions of memory cells formed by intersecting with millions of memory cell strings. The memory cells in memory block 30 may be single-level memory cells or multi-level memory cells, wherein the single-level memory cell may be a single-level memory cell (SLC) capable of storing 1 bit; and the multi-level memory cell may be a multi-level memory cell (MLC) capable of storing 2 bits, a tri-level memory cell (TLC) capable of storing 3 bits, a quarter-level memory cell (QTC) capable of storing 4 bits or a penta-level memory cell (PLC) capable of storing 5 bits. As shown in FIG. 3, the memory block 30 further includes a bit line (BL), a bit line selector (BLS, also known as top select gate line SGDL), a source line (SL) and a source select line (SLS, also known as bottom select gate line SGSL), which, together with the word line (WL), may address any memory cell in the memory block 30.

In some embodiments, the memory device 1022 as shown in FIG. 2 further includes a read/write circuit, a row decoder and a column decoder. In some embodiments, peripheral circuits are used to access the memory array 1022-1 on opposite sides of the memory array 1022-1 in a symmetric manner so as to reduce access and circuit density on either side by a half. The read/write circuits include a plurality of sense blocks SB configured to read or program pages of the memory array 1022-1 in parallel. The memory array 1022-1 may be addressed via row decoders through word lines and via column decoders through bit lines. In some embodiments, the memory array 1022-1, the control circuit 1022-2, the read/write circuits, the row decoders and the column decoders may be manufactured on a chip, wherein the dashed line block in FIG. 2 may also represent the chip. External signals and data are transferred between the memory controller 1021 and the chip via the signal line 1022-3. FIG. 2 further shows a plurality of dummy memory cells, dummy word lines and dummy bit lines (not shown) are arranged in the dummy memory region DMX and DMY. As shown in FIG. 2, the dummy memories DMX1-DMX2 and DMY1-DMY2 are arranged on side faces of the memory array 1022-1 for read/write test after the memory system is completed.

The control circuit 1022-2 is configured to cooperate with the read/write circuits to implement storage operations on the memory array 1022-1. The control circuit includes a state machine, an on-chip address decoder and a power control module, wherein the state machine is configured to provide chip level control over the memory operations; the on-chip address decoder is configured to provide an address interface between the addresses used by the controller of the host or memory system and the hardware addresses used by the row decoders and column decoders. The power control module is configured to control the power and voltage provided to word lines and bit lines for each memory operation.

For the memory array, in the 3D architecture semiconductor memory technology, vertical structures are stacked to increase the number of layers and physical pages so as to increase the density of the memory system. In an embodiment, the memory system 200 may be a discrete memory or memory assembly of a host 101. In some other embodiments, the memory system 200 may also be a part of an integrated circuit, such as a part of a system on chip (SOC). At this time, the memory system 200 is stacked or otherwise assembled together with one or more components of the host 101.

In the data system 100 of FIG. 1, the host 101 may include a host processor and a host RAM, wherein the host RAM may include DRAM, SDRAM or any other suitable non-volatile or volatile memory devices. The memory system 200 may be provided with one or more communication interfaces for communicating with one or more components in the host 101. The one or more communication interfaces may be Serial Advanced Technology Attachment (SATA) interfaces, Peripheral Component Interface Express (PCIe) interfaces, PCI interfaces, PCI-X interfaces. Universal Serial Bus (USB) interfaces, Universal Flash Storage (UFS) interfaces, eMMCTM interfaces etc.

Figure 5A:
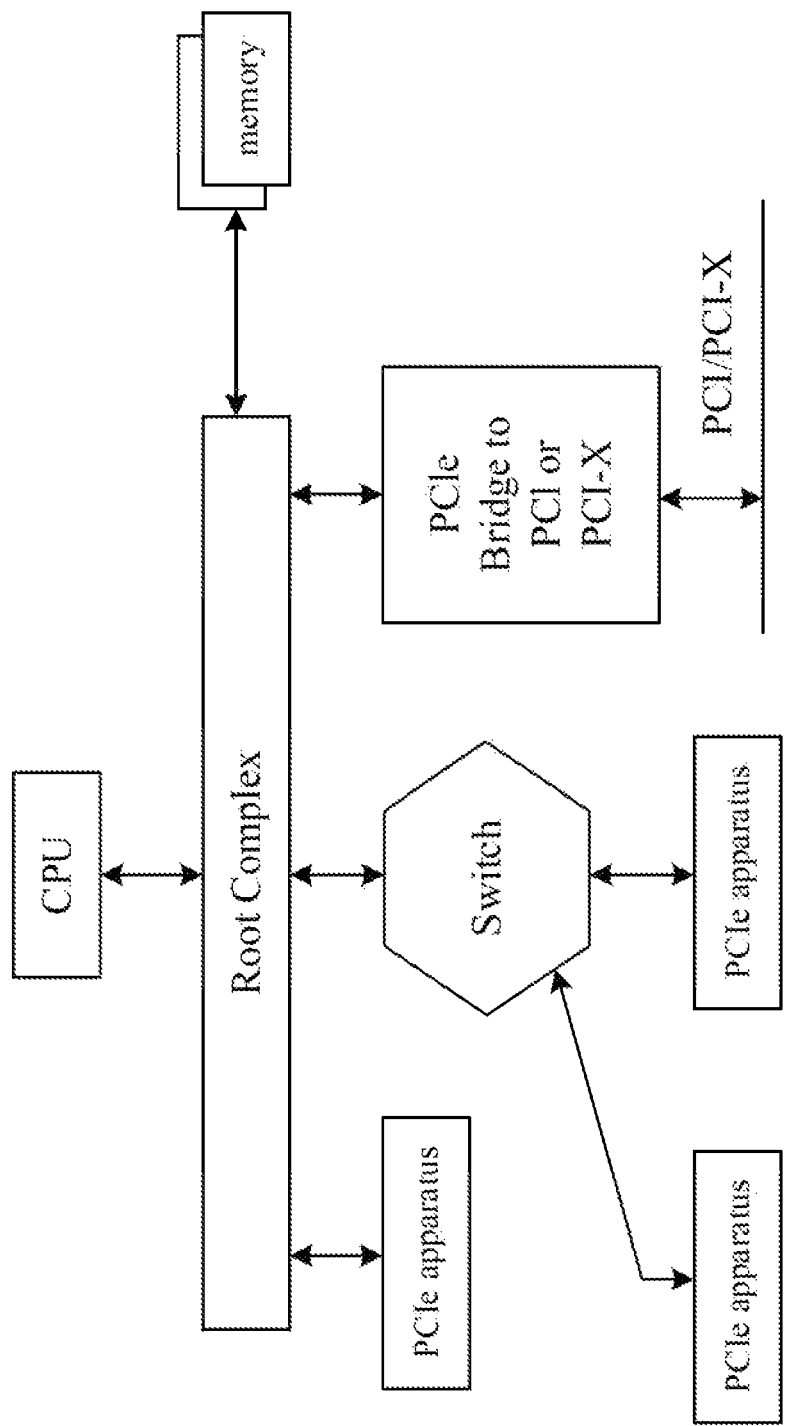
FIGS. 5A-5C are a diagram of a communication topology structure of a data system with PCIe interfaces provided in an embodiment of the present disclosure.
Figure 5B:
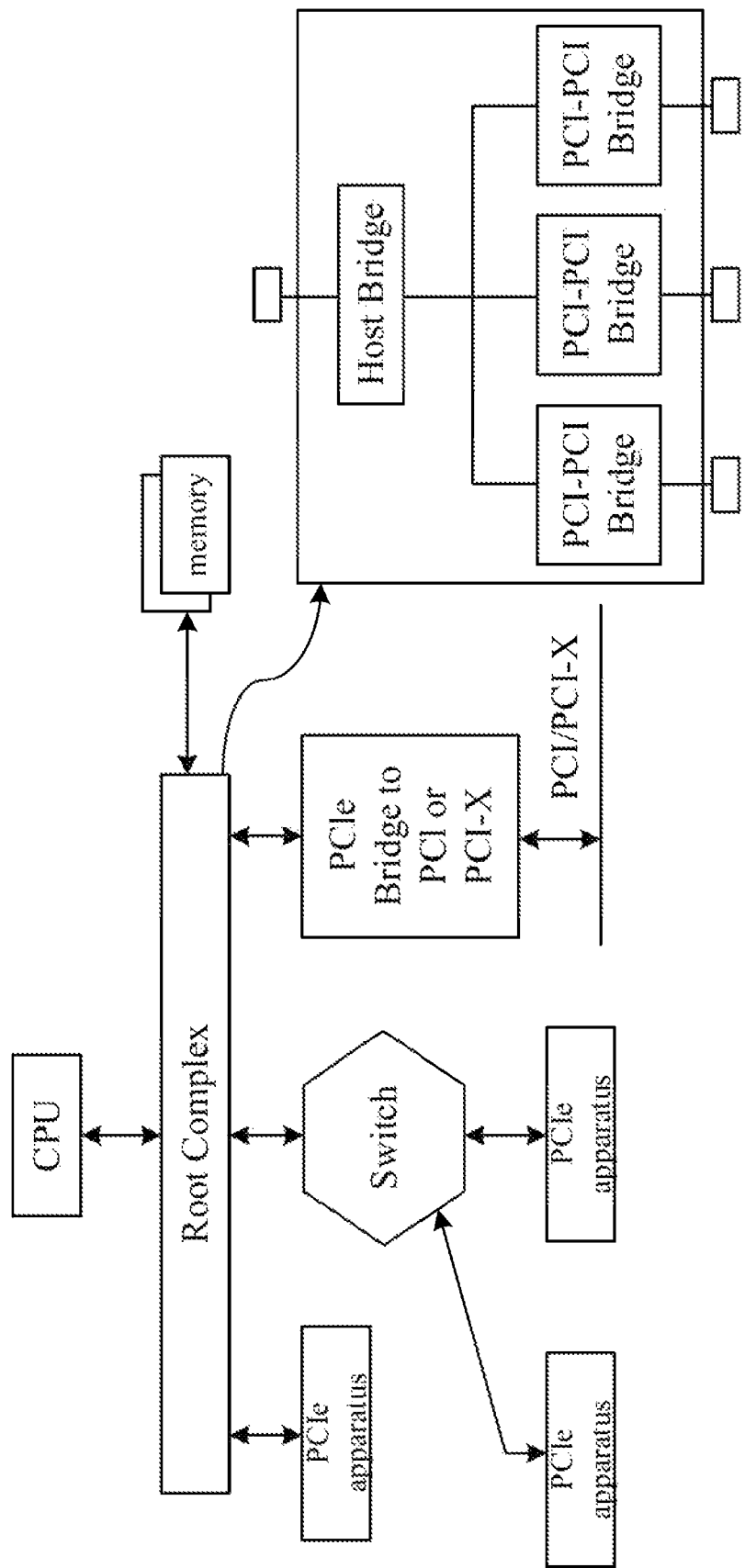

PCIe interfaces are commonly used at present, which are serial buses. Unlike the single channel of SATA, PCIe connection may expand bandwidth by increasing the number of channels with high flexibility. The more the channels are, the faster the speed is, however, the higher the cost is, and the more the occupied space is and the more the power is consumed. The PCIe interface develops from the PCI interface technology, but is faster than PCI interface and PCI-X interface because PCIe is different in nature from PCI and PCI-X in terms of physical transfer. As the data transfer rate demand is becoming higher and higher, due to the limitation of the bus clock frequency, serial transfer of data by PCIe is faster than parallel transfer of data by PCI and PCI-X. In some embodiments, in a data system 100, various apparatuses with PCIe interfaces (hereinafter "PCIe apparatuses") may communicate with the host 101 with a tree topology. In particular, as shown in FIG. 5A, the entire topology formed by apparatuses with PCIe interfaces (hereinafter PCIe topology structures) may be a tree structure. Root Complex (RC) is the root of the tree that is the representative of the host processor (which may be implemented by CPU) in the data system 100 for communicating with other parts of the entire data system 100. For example, the CPU accesses the host RAM (memory) via RC, and accesses other first apparatuses 102 in the PCIe topology via RC. The RC is complex internally. In summary, the function implemented by RC may be an internal PCIe bus and some PCIe ports expanded by several PCIe bridges as shown specifically in FIG. 5B.

Figure 5C:
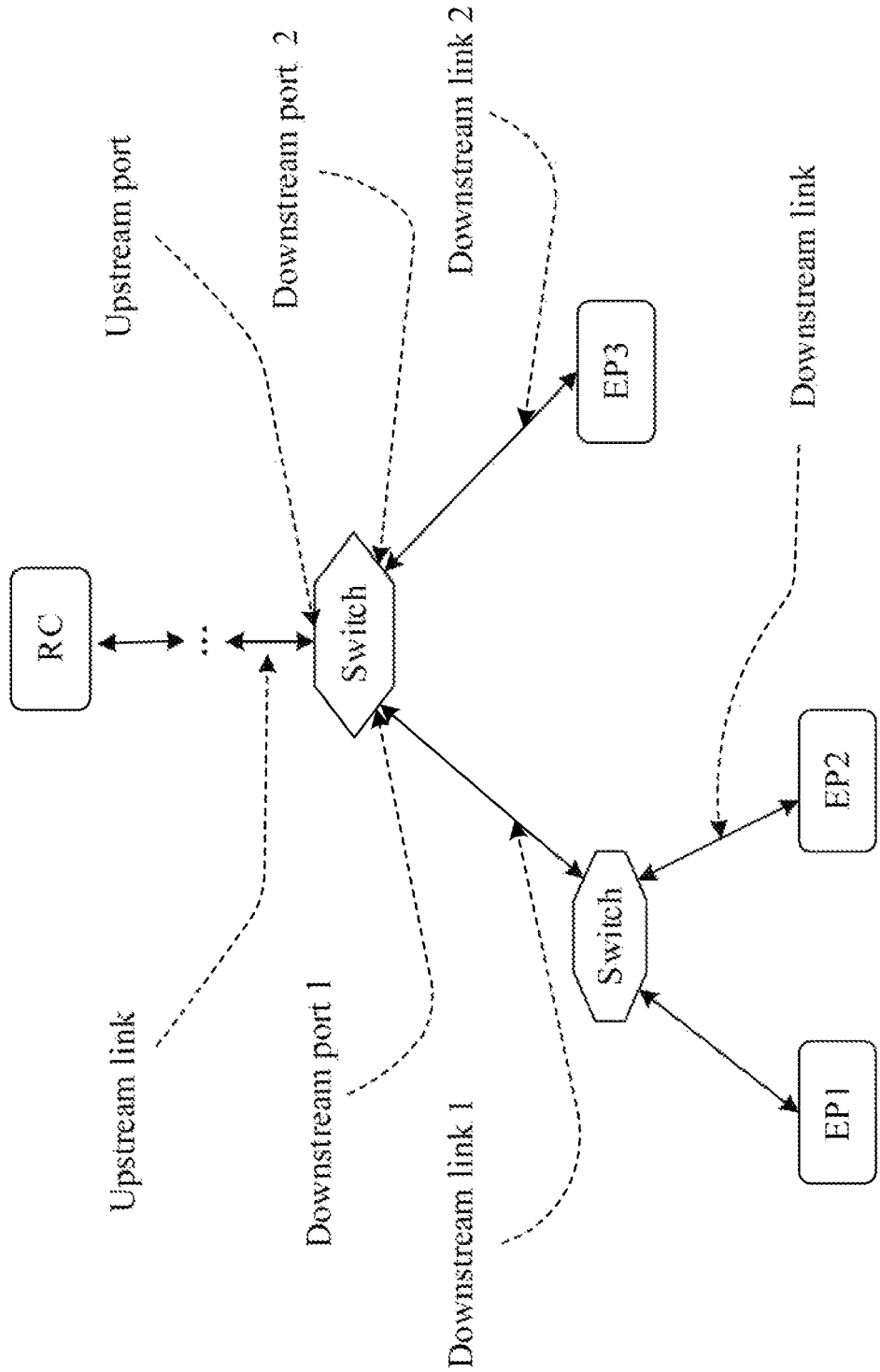

As shown in FIG. 5C, the switch in the PCIe topology expands the PCIe ports. Ports nearby the RC are referred to as upstream ports and ports that are branched out are referred to as downstream ports. One switch has only one upstream port and can expand several downstream ports. Downstream ports may be directly connected to endpoints such as PCIe apparatus and first apparatus 102. The downstream ports may be further connected with the switch to expand more ports such as EP1, EP2 and EP3 in FIG. 5C.

Figure 6:
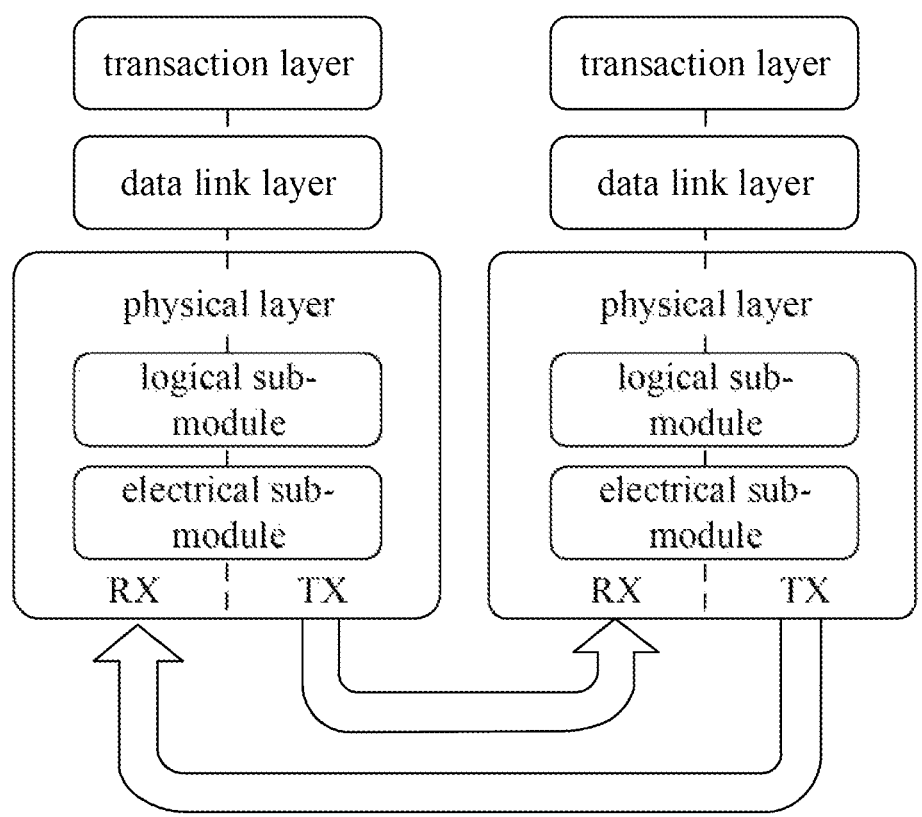
FIG. 6 is a diagram of a layered structure with PCIe interface provided in an embodiment of the present disclosure.

In some embodiments, a PCIe apparatus may be implemented in layers. For example, as shown in FIG. 6, three layers are defined: a transaction layer, a data link layer and a physical layer (including logical sub-modules and electrical sub-modules) each with different function but serving the upper layer. Data in PCIe are all transferred in form of packets and packets for each layer have fixed format. In some embodiments, each endpoint and each switch in the PCIe topology need to implement the above-described three layers.

Figure 7A:
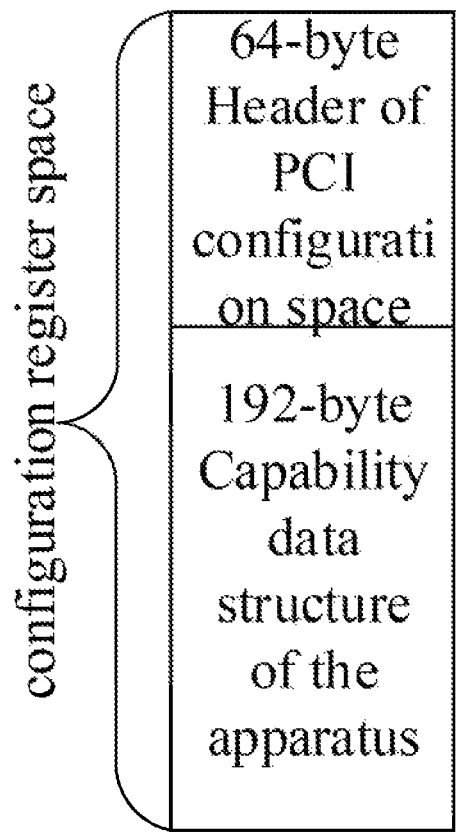
FIGS. 7A and 7B are diagrams of a configuration space provided in an embodiment of the present disclosure.
Figure 7B:
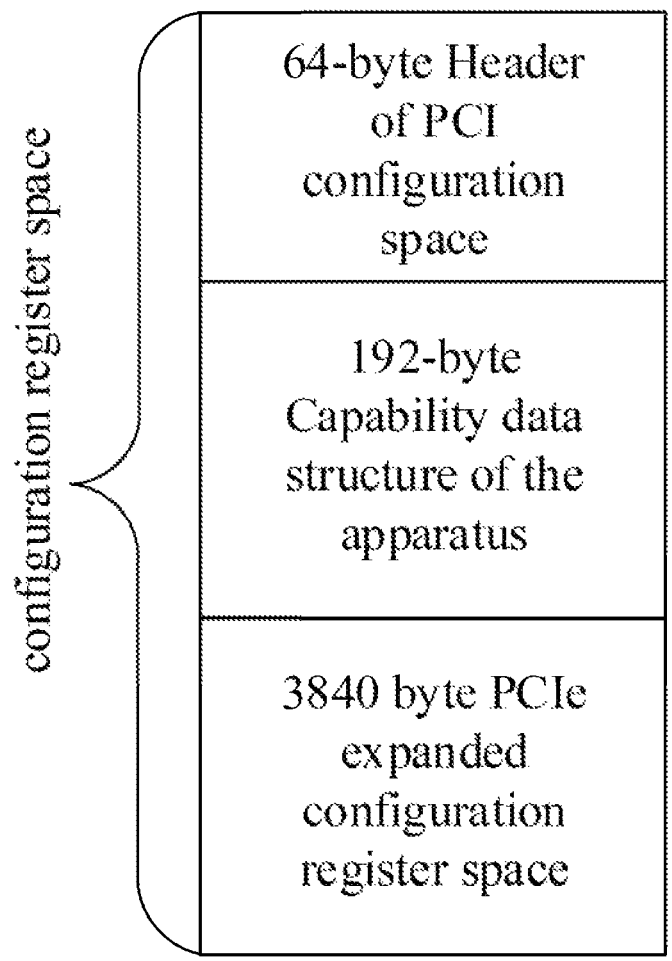

In the PCIe topology, each PCIe apparatus (such as the aforementioned Endpoint and the Switch) has (or is configured with) such a space and the host 101 may obtain some information of the PCIe apparatus coupled with the host 101 by reading the space and may also configure the PCIe apparatus couple with the host 101 through the space. The space may be referred to as PCIe configuration space, namely an implementation of the PCI configuration space as described in embodiments of the present disclosure. The configuration space can be specified by a protocol. There are definitions as to what contents to be placed in what place. The configuration space can be used in PCI and PCI-X age, with a structure as shown in FIG. 7A, for example. After entering the PCIe age, a configuration-space structure can be as shown in FIG. 7B, for example. The whole configuration space may be a set of a series of registers consisting of two parts: a 64-Byte Header and a 192-Byte capability data structure (the structure of PCI and PCI-X age), for example. In the PCIe age, in addition to the above-described parts, the structure of the configuration space further includes a 3840-Byte Capability data structure in some examples. Capability may refer to the capability owned by the PCIe apparatus under a certain function. It is possible to configure to have what specific capability via the 64-Byte Header.

In some embodiments, each PCIe apparatus has at least one configuration space. Since each PCIe apparatus may have a plurality of functions, for example, serving both as a hard disk and a network adapter, each function corresponds to a configuration space. In some other embodiments, the configuration space to which each function corresponds may contain one or more Capabilities.

The working principle of the data system 100 in FIG. 1 is as follows in some examples. The memory controller 1021 may receive instructions from the host 101 and communicate with the memory device 1022. For example, the memory controller 1021 transfers data to one or more memory cells, planes, sub-blocks, blocks or pages in the memory device 1022 by executing write or erase instruction; or the memory controller 1021 transfers data to the host 101 by executing read instructions. With respect to hardware, the memory controller 1021 may include one or more controller units, circuits or components configured to control access across the memory device 1022 and provide a transform layer between the host 101 and the memory system 200. The memory controller 1021 may further include one or more input/output (I/O) circuits, wires or interfaces to transfer data to the memory device 1022 or transfer data from the memory device 1022. The memory controller 1021 may further include a memory management unit and an array control unit.

The memory management unit may include circuit hardware or firmware such as a plurality of components or integrated circuits associated with various memory management functions. In order to describe the technical solution of the present disclosure, example memory operations or management functions will be described in context with the NAND memory as an example. It should be appreciated by those skilled in the art that other forms of non-volatile memories may have similar memory operation or management functions. The management functions of a NAND memory may include wear-leveling such as waste collection or recovering, error detection or correction, block rollback or one or more other memory management functions. The memory management unit may process the host's 101 instructions into commands recognizable by the memory system 200, for example, resolving or formatting instructions received from the host 101 into commands related to operations of the memory device 1022. Alternatively, the memory management unit may also generate device commands for the array control unit or one or more other components of the memory system 200, such as commands for implementing various memory management functions.

The memory management unit may be configured to include a group of management tables for maintaining various information associated with one or more components of the memory system 200, such as various information associated with the memory array coupled to the memory controller 1021 or one or more memory cells. For example, the management tables may contain information such as block ages, block erasing counts, error histories or one or more error counts of one or more blocks of the memory cells coupled to the memory controller 1021. The error counts may include operation error counts, bit reading error counts etc. In some embodiments, in case that a detected error count is above a certain threshold, the bit error is uncorrectable. In some embodiments, management tables may or may not correct counts of bit errors.

The management tables may further contain one or more UP tables containing one or more L2P pointers associated with physical addresses at memory array of the memory device 1022 with logical addresses. In some embodiments, the management tables may contain unencrypted L2P tables and/or encrypted L2P tables. Unencrypted L2P tables may include UP pointers indicating unencrypted logical addresses and unencrypted physical addresses; and encrypted UP tables may include encrypted L2P pointers of encrypted physical addresses and unencrypted logical addresses. In practical application process, the management tables may be shown at the memory management unit. That is, the management tables may be stored in the RAM of the memory controller 1021. In some other embodiments, the management tables may also be stored in the memory array of the memory device 1022. In use, the memory management unit may read partial or all cached management tables from the RAM of the memory controller 1021; and may also read the management tables from the memory array of the memory device 1022.

The array control unit may include circuitries or components configured to control to complete the following related memory operations. For example, the array control unit controls writing data into one or more memory cells in the memory system 200 coupled to the memory controller 1021, reading data from the one or more memory cells, or erasing the one or more memory cells. The array control unit may receive commands sent by the host 101, or host commands generated inside the memory management unit, wherein host commands may be commands associated with wear-leveling, error detection or correction.

The array control unit may further include an error correction code (ECC) component containing an ECC engine or other circuitries for detecting or correcting the following related errors that may be errors that might occur during the process of writing data into one or more memory cells in the memory system 200 coupled to the memory controller 1021 or reading data from the one or more memory cells. The memory controller 1021 is configured to effectively detect error events related to various operations or data storage such as bit errors, operation errors etc., and restore from the error events, and at the same time maintain the integrity of data transferred between the host 101 and the memory system 200 or maintain the integrity of the stored data by for example using redundant RAID storage, and can remove, for example withdraw memory resources with failures such as memory cells, memory array, pages, blocks etc. for preventing future errors.

In the data system 100 of FIG. 1, the memory controller 1021 further includes an encryption/decryption unit configured to implement cryptography operations on data, such as encrypting unencrypted physical addresses and decrypting encrypted physical addresses as described herein. In some embodiments, the encryption/decryption unit may be implemented with hardware, software or combination of software and hardware. For example, the encryption/decryption unit may contain instructions executed at the processor of the memory controller 1021 or similar hardware component. In some embodiments, the encryption/decryption unit may include dedicated hardware for executing cryptography operations.

The memory array in the memory device 1022 may include a number of memory cells arranged in one or more devices, one or more planes, one or more sub-blocks, one or more blocks and one or more pages. As an example, the 48 GB TLC NAND memory system may include 18592 bytes (B) of data per page (16384+2208 bytes), 1536 pages per block, 548 blocks per plane and 4 or more planes per device. As another example, the 32 GB MLC memory system (storing two bits of data (i.e., 4 programmable states) per cell) may include 18592 bytes (B) of data (16384+2208 bytes) per page, 1024 pages per block, 548 blocks per plane and 4 planes per device. However, as compared to the corresponding TLC memory system, the write time required is reduced by half, and the programming/erasing (P/E) cycles increase by two times. Other examples may include other numbers or arrangements. In some examples, the memory system or a part thereof may operate selectively in SLC mode or the desired MLC mode (e.g., TLC, QLC etc.).

The memory array in the memory device 1022 includes one or more physical address locations. A physical address location is the location on the memory array in the memory device 1022 that is uniquely associated with the physical address. In operation, data is often written into or read from the memory system in pages and erased in blocks. However, one or more memory operations such as read, write, erase etc. may be executed on a larger or smaller group of memory cells as desired. Therefore, in some examples, physical addresses include more or less than a page. The size of data transferred in the memory system 200 is generally referred to as a page, while the size of data transferred in the host is generally referred to as a sector.

Although a page of data may include several bytes of user data (for example, including several sectors of data payload) and corresponding metadata, the size of the page generally only refers to the number of bytes for storing user data. As an example, a data page with a page size of 4 KB may include 4 KB of user data (such as exhibiting 8 sectors of a size of 512 B) and several bytes (such as 32 B, 54 B, 224 B etc.) of metadata corresponding to the user data, such as integrity data (e.g., error detection or correction code data), address data (such as logical address data etc.) or other metadata associated with the user data. Physical address locations for storing metadata may be referred to as over supply physical address locations.

Different types of memory cells or the memory device 1022 may provide different page sizes or may need different amount of metadata associated with it. For example, different memory system types may have different bit error rate that can result in different amount of metadata necessary to ensure the integrity of data pages (for example, a memory system with higher bit error rate may need more bytes of error correction code data than a memory system with lower bit error rate). For example, a multi-level cell (MLC) NAND flash device may have a higher bit error rate than a corresponding single-level cell (SLC) NAND flash device. Therefore, a MLC device may need more metadata bytes for error data than a corresponding SLC device.

The first apparatus 102 in the data system 10) shown in FIG. 1 often needs to updating firmware while in development and use. In practical use, the first apparatus 102 may be different types of PCIe apparatuses such as the aforementioned hard disk and network adapter, etc. According to the location of the first apparatus in the PCIe topology, the first apparatus 102 may also be an Endpoint, a Switch, etc. The first apparatus may also be a PCIe apparatus provided by different developers. In some implementations, different types PCIe apparatuses have firmware updating manners defined by themselves and may need apply different driving tools (driver software or driver software tools) for firmware updating. In some embodiments, the firmware updating manners for PCIe apparatuses may include: a first type of in-band updating, in the storage space, the debugging person configures for example nonvolatile memory host controller interface specification (NVMHCIS, or simply NVM Express (NVMe)) type of PCIe apparatus, which can update firmware in the apparatus via commands in NVMe standard, a vender unique (VU) manner etc. A second type is out-of-band updating. Firmware to be updated is acquired from the host with the external interfaces of the PCIe apparatus such as the system management bus (SMBus) interface and the universal asynchronous receiver/transmitter (UART) interface. And the firmware to be updated acquired on the host is transferred to the PCIe apparatus by connecting the host with the Boot pin on the printed circuit board (PCB) in the PCIe apparatus to implement firmware updating of the PCIe apparatus. The third type is using a debugging instrument. For example. Joint Test Action Group (JTAG) is an international standard test protocol primarily used for internal test of chips. As another example. Enhanced Joint Test Action Group (EJTAG) is a specification defined by expanding on the basis of JTAG and is a hardware/software sub-system, which implements a set of debugging features based on hardware for supporting on-chip debugging.

In the above-described three firmware updating manners, for the in-band updating, the precondition for in-band updating operation is to guarantee that the application layer protocol in the data system 100 is available. Those skilled in the art should appreciate that different PCIe apparatuses may correspond to different application layers. Therefore, while updating apparatus firmwares, various approaches and driving tools are used. For example, firmware updating manners for a NVMe type PCIe apparatus, an Ethernet Card type PCIe apparatus, an image processing unit (GPU) type PCIe apparatus are different. This would explain the fact that before a certain type of PCIe apparatus (such as a solid state disk (SSD) under NVMe protocol) implements firmware updating, it is required to set the NVMe SSD in the read-only memory (ROM) mode and a protocol stack will be run in the ROM mode to prepare for firmware updating. In this ROM mode, different PCIe apparatus corresponds to different application layer protocols, which would need different drivers, and in turn need tools matching the drivers to cooperate with the driver for firmware updating of the PCIe apparatus. For the above-described three firmware updating manners, for different PCIe apparatuses, the firmware updating is complex and expensive, and is not universal.

Figure 8:
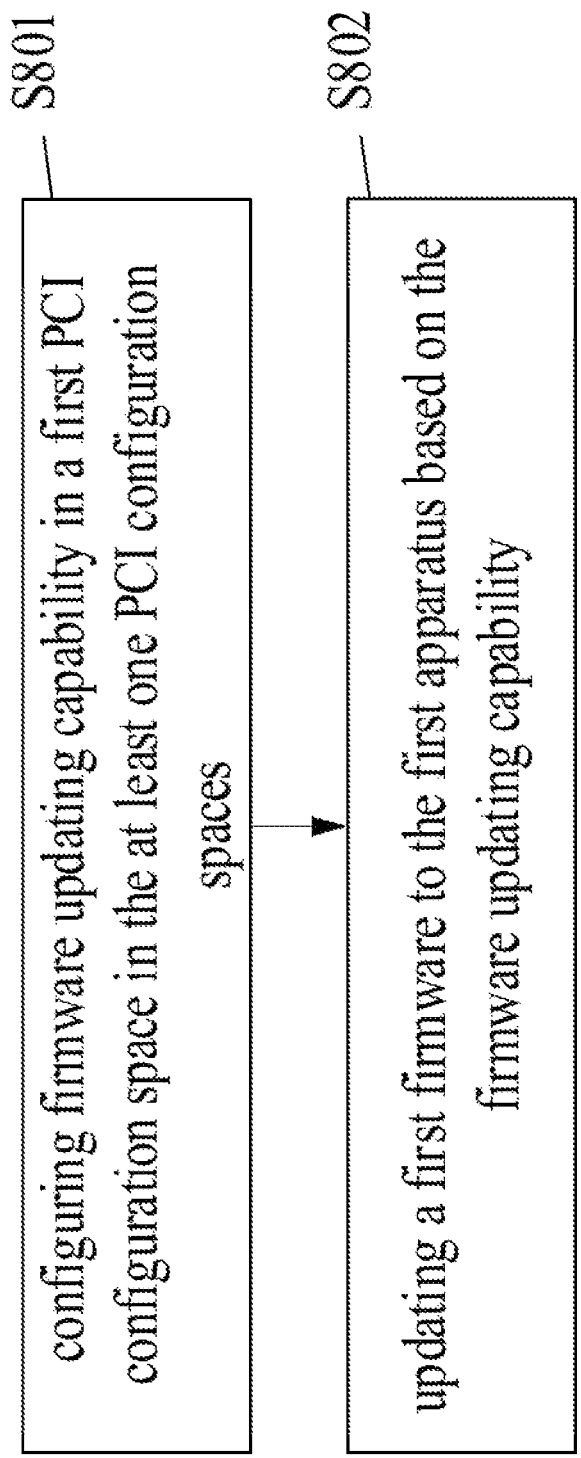
FIG. 8 is a flow chart of a firmware updating method provided in an embodiment of the present disclosure.

In view of this, in order to address the above-described technical problem, as shown in FIG. 8, a flow chart of a firmware updating method provided in an embodiment of the present disclosure is shown. In FIG. 8, the method is applied to a first apparatus with at least one PCI configuration space. And the specific method flow may include:

S801: configuring firmware updating capability in the first PCI configuration space in the at least one PCI configuration space;

S802: updating the first firmware to the first apparatus based on the firmware updating capability. For example, the first apparatus is updated with the first firmware.

It is to be noted that the first apparatus described herein may be any apparatus having at least one of the aforementioned PCIe interface. PCI interface and PCI-X interface. Since it has now entered the PCIe age, without any specific statements, in the following embodiments described in the present disclosure, the idea of the present disclosure will be described with respect to an example in which the first apparatuses are various apparatuses with PCIe interfaces.

Figure 9:
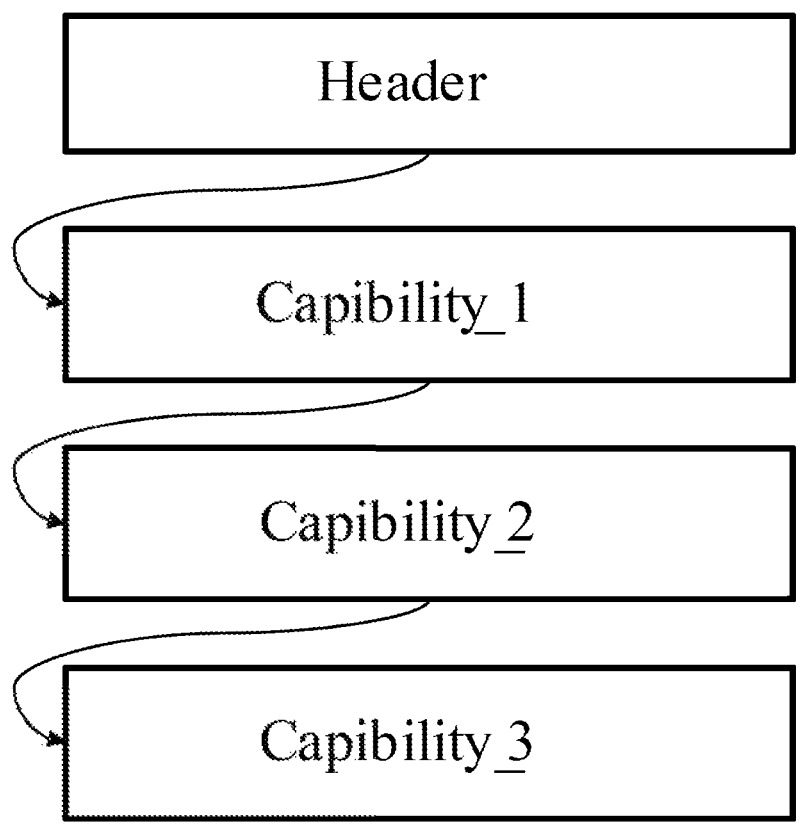
FIG. 9 is a diagram I of relationship among capabilities in the configuration space provided in an embodiment of the present disclosure.

Here, based on the above description of PCIe apparatus, the first apparatus may correspond to one or more functions, each function corresponds to one configuration space and each function may also correspond to one or more Capabilities. Therefore, the first apparatus may have at least one configuration space for configuring functions for itself. Associations among various Capabilities and Headers in the configuration space corresponding to a certain function may be shown in FIG. 9. In FIG. 9, description is made with three capabilities as an example, wherein Header, Capability_1, Capability_2 and Capability_3 are connected in turn to form a chain table.

As an optional implementation, S801 may include:
defining the first data structure corresponding to the firmware updating capability in the first PCI configuration space;
adding the firmware updating capability to the first capability chain table based on the rust data structure to form the second capability chain table such that the firmware updating capability is configured in the first PCI configuration space; wherein the first capability chain table is the chain table formed by capabilities already existing in the first PCI configuration space.

Here, the first PCI configuration space is one of the at least one PCI configuration space. In some embodiments, if the first apparatus has a plurality of functions, the first PCI configuration space is determined according to certain functions in the first apparatus that need to be updated by the user. For example, if the first apparatus has the aforementioned hard disk and network adapter functions, and if the user wants to update the firmware of the hard disk function, the configuration space corresponding to the hard disk function should be selected as the first PCI configuration space. That is, as described herein, a customized new capability is added in the chain table of capabilities that have been able to implement in the first PCI configuration space in the first apparatus to form a new capability chain table such that the first apparatus can implement the new capability. When the new capability is the firmware updating capability as described in embodiments of the present disclosure, an optional configuration flow may include specifically the following steps.

First, the first data structure corresponding to the firmware updating capability is defined in the first PCI configuration space. An optional first data structure is shown in the following table 1. The first data structure may include a basic information domain, a command information domain, a receipt information domain and a data information domain, wherein the basic information domain may include pointer information, ID information of the type to which the firmware updating capability belongs, the length information of the first data structure, the version information of the firmware updating capability and the Identity ID information of the type to which the firmware updating capability belongs, etc.

TABLE 1

| Basic information domain | Command information domain | Receipt information domain | Data information domain |
| --- | --- | --- | --- |

In some embodiments, the pointer information is used to point to the next capability, indicating the location of the firmware updating capability in the capability chain table.

In some embodiments, the type to which the firmware updating capability belongs may include two types: one being standard protocol capability; another being expanded capability. The standard protocol capability is a capability specified in the protocol and the expanded capability is a capability expanded beyond the standard protocol capability according to different functions, devices or developers.

In some embodiments, the type ID information may be used to indicate whether the firmware updating capability is an expanded function in the first apparatus or a standard protocol capability in the first apparatus. For example, if ID 0×B indicates the expanded function provided by the developer, then the ID information of the type to which the rust data structure belongs in the firmware updating capability is 0×B.

In some embodiments, in an apparatus, capabilities belong to the same type may be more than one. For example, there are three capabilities belonging to expanded capability in the first apparatus. The three capabilities are distinguished according to the Identity ID information. The Identity ID information may be any ID that any host can identify such as characters and numbers.

In some embodiments, the command information domain, the receipt information domain and the data information domain in the firmware updating capabilities may be some commands for the host and the first apparatus interacting with each other, the receipt of the execution of these commands and data-related information, respectively. The commands may be some commands for implementing firmware updating in embodiments of the present disclosure, such as data write command, update command etc. The date-related information may include the first firmware, the length of the first firmware and the offset of the address for placing the first firmware. It is to be noted that as described above, since the configuration space may be implemented by a series of registers, information in the command information domain, the receipt information domain and the data information domain in the first data structure may be cached in respective registers. In some embodiments, the data information domain may be further divided into an offset sub-domain, a data sub-domain, a length sub-domain for placing the data address offset of the first firmware, the data length of the first firmware respectively.

Next, the existing capabilities and the first capability chain table formed by existing capabilities are obtained, wherein the first capability chain table is a chain table formed by existing capabilities in the first PCI configuration space.

Then, the firmware updating capability is added to the first capability chain table based on the first data structure to form a second capability chain table. One approach may be setting the pointer information of the last capability in the first capability chain table to point to the firmware updating capability such that the first PCI configuration space is configured with the firmware updating capability. It is also possible to add the firmware updating capability between any two capabilities in the first capability chain table as desired, that is, reconstructing the second capability chain table as desired.

Figure 10:
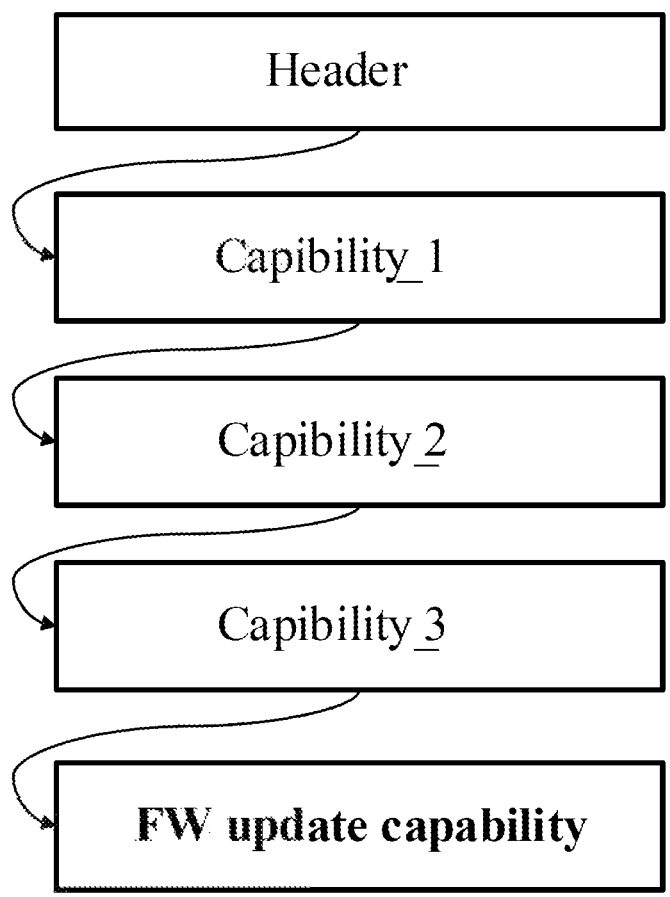
FIG. 10 is a diagram II of relationship among capabilities in the configuration space provided in an embodiment of the present disclosure.

For example, a configuration space of the PCIe apparatus as shown in previous FIG. 9 has been configured with three capabilities. The firmware updating capability is configured in the configuration space. After completing configuration, associations among capabilities in the configuration space in the PCIe apparatus are shown in FIG. 10. Header. Capability_1, Capability_2, Capability_3 and FW update Capability are connected successively to form a chain table, namely the second capability chain table.

After completing configuration based on the above content, the first apparatus has the firmware updating capability. In this case, in some embodiments, S802 may include:
  receiving one or more write commands containing data related to the first firmware;
  writing the data related to the first firmware to the respective location in the first data structure;
  upon receiving the update command, updating the first firmware to the respective storage region of the first apparatus based on the update command.

It is to be noted that the data related to the first firmware may include the length of the first firmware, the first firmware itself and the offset of the address for placing the first firmware. The respective location in the first data structure for writing are the data information domain in the afore-mentioned first data structure. In some embodiments, the data information domain may be implemented by a set of registers. In this case, that is, the data related to the first firmware is written to respective registers to wait for the arrival of update command for updating the first firmware to specified locations (storage regions) of the first apparatus.

That is, next, upon receiving the update command, the first firmware is updated to the respective storage region of the first apparatus based on the update command.

It should be known that a PCIe type apparatus has a three-layer structure, namely the transaction layer, the datalink layer and a physical layer. Data is transferred in form of packets between the host and the PCIe type apparatus, between the PCIe type apparatus and the PCIe type apparatus. The transaction layer opens packets according to types of upper layers' (software layer or application layer) requests, destination address and other related attributes and generates transaction layer packets (TLP), and then the TLP arrives at the target apparatus through the datalink layer and the physical layer. For PCIe type apparatuses, they have different spaces, memory spaces (or known as address spaces) IO spaces and configuration spaces, wherein the address space may be used for PCIe type apparatus to read/write a large amount of data. For accesses to different spaces, the types of TLPs are different. For the access to the configuration space, Configuration TLPs are used; for the access to the memory space, Memory TLPs are used, and for the access to IO space, IO TLPs are used. In the firmware updating method provided in the embodiments of the present disclosure, the first firmware is written into the firmware updating capability defined in the configuration space. Therefore, in embodiments of the present disclosure, Configuration TLPs are used to place data, update commands and receipt related to the first firmware to corresponding locations of the first data structure of the firmware updating capability.

It is to be noted that at present, the largest payload for a TLP is 4 KB in some examples. Data with a length greater than 4 KB can be divided into several TLPs for transfer. That is, when the length of data related to the first firmware is greater than 4 KB, the data can be divided into several TLPs for transfer. That is, one or more write commands are needed to write data related to the first firmware to the memory region (register) corresponding to the firmware updating capability.

It is to be noted that the host can send an update command when all data related to the first firmware is transferred. When the first apparatus receives the update command, the first firmware is updated to the respective memory region of the first apparatus based on the update command. In particular, after receiving the update command, the rust firmware stored in the afore-mentioned data information domain is read and the first firmware is updated to the specified memory region such as the memory array or the RAM of the memory controller.

It should be understood that the afore-mentioned write command or update command are both transmitted by the host coupled with the first apparatus via the operating system. Specifically, the host interacts with the firmware updating capability in the first apparatus via the setPCI command in the operating system. In the process of data transfer, commands are transferred to the first apparatus in form of Configuration TLPs. In other words, the user programs the afore-mentioned write command or update command via the setPCI command and the write command or update command arrives at the first apparatus in form of Configuration TLP in the transfer process.

In some embodiments, the method further includes:
  receiving a read command and feeding back an identifier of successful updating of the first firmware based on the read command to indicate the completion of updating of the first firmware.

It is to be noted that herein an identifier indicating the completion of updating of the first firmware is fed back to the host after completing updating. Since the access to the configuration space is generally initiated by the host, the identifier indicating the completion of updating of the first firmware may be stored in the receipt information domain in the first data structure and read by the host.

In some other embodiments, the method further includes:
receiving an activating command carrying the activating manner; and activating the first firmware based on the activating manner in the activating command.

It is to be noted that the transfer manner of the activating command is similar to the above contents and will not be described in detail herein. The activating manner may be defined by the user. For example, the activating manner may be instant activation, or activating upon next time powering up the PCIe apparatus etc.

Figure 11:
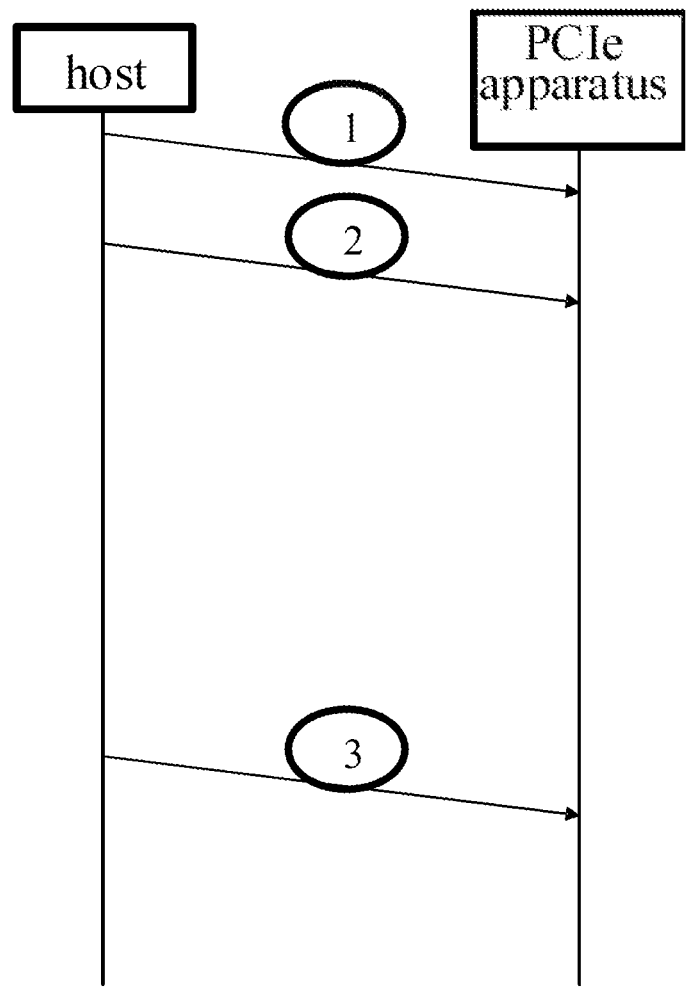
FIG. 11 is a flow chart I of a firmware updating for a first apparatus provided in an embodiment of the present disclosure.

In order to understand the firmware updating method provided in embodiments of the present disclosure, after configuring the firmware updating capability, the firmware updating flow of the first apparatus may be specifically as shown in FIG. 11.

In FIG. 11, the firmware updating flow is specifically as follows.
1. The host transmits an updated firmware to the PCe apparatus.
 a. The data contents of the first firmware to be updated this time is written into the data sub-domain in the data information domain of the first data structure of the firmware updating capability.
 b. The data address offset of the first firmware to be updated this time is written into the offset sub-domain in the data information domain.
 c. The data length of the first firmware to be updated this time is written into the length sub-domain in the data information domain.
2. Same as 1, until all data updating related to the first firmware is completed.
 d. The update command is written into the command information domain.
 e. The receipt domain is read until the successful execution of update command is read.
3. The activating command is sent to the PCIe apparatus.
 f. The activating manner is written to the data information domain.
 g. The activating command is written to the command domain.
 H. The receipt domain is read until the successful execution of activating command is read.

It is to be noted that here the process described in step 1 is a specific implementation flow (steps a, b, c) of the afore-mentioned step of receiving one or more write commands containing data related to the first firmware and writing data related to the first firmware to locations corresponding to the first data structure. The process described in step 2 is a specific implementation flow (step d) of the afore-mentioned step of receiving the update command and updating the first firmware to respective memory region of the first apparatus based on the update command and a specific implementation flow (step e) of receiving the read command and feeding back an identifier indicating successful updating of the first firmware based on the read command to indicate the updating of the first firmware is completed. The process described in step 3 is a specific implementation flow (steps g, h) of the afore-mentioned step of receiving an activating command carrying the activating manner; and activating the first firmware based on the activating manner in the activating command. It should be understood that in general case, step 1 is executed before step 2 to complete transfer of firmware first and then implement updating of firmware. The execution of step 3 is not immediately following steps 1 and 2 and may be implemented while activation is desired.

The afore-mentioned operation of configuring firmware updating capability in the first PCI configuration space can be carried out when a first firmware updating takes place at the PCIe apparatus, and subsequent firmware updating may directly use the existing firmware updating capability. To this end, in some embodiments, before configuring the firmware updating capability in the first PCI configuration space in the at least one PCI configuration space, the method further includes:

The operating system in the host coupled with itself is used to detect whether the firmware updating capability is configured in the first PCI configuration space.

In some embodiments, the using operating system in the host coupled with itself to detect whether the firmware updating capability is configured in the first PCI configuration space may include:
receiving a review command; executing the review command based on the operating system to obtain the configuration information of the at least one PCI configuration space contained in the first apparatus; and determining whether the firmware updating capability is configured in the first PCI configuration space based on the configuration information.

It is to be noted that the review command may be the command lsPCI in PCIe protocol standard. This command is to display information of all PCIe apparatuses in the data system with the command format of lsPCI-x/-xxx/-xxxx, wherein the hexadecimal information x displays configuration spaces of PCI apparatuses; -xxx displays partial apparatuses that would crash while reading configuration spaces; and -xxxx displays expanded configuration spaces of PCI-x2.0 or PCI-e bus. In embodiments of the present disclosure, execution is implemented with the lsPCI-x/-xxx/-xxxx command in the operating system of the first apparatus to display the configuration spaces of the first apparatus so as to determine the configuration information of the at least one PCI configuration space, and in turn determine whether the firmware updating capability is configured in the first PCI configuration space based on the configuration information. The operating system may be Linux operating system etc.

In some embodiments, the method includes:
Once determining the first PCI configuration space is not configured with the firmware updating capability, configuring in the afore-mentioned manner; and after configuration, updating the first firmware to the first apparatus based on the firmware updating capability.

In some embodiments, the method further includes:
Once determining the first PCI configuration space has been configured with the firmware updating capability, directly updating the first firmware to the first apparatus based on the firmware updating capability.

Figure 12:
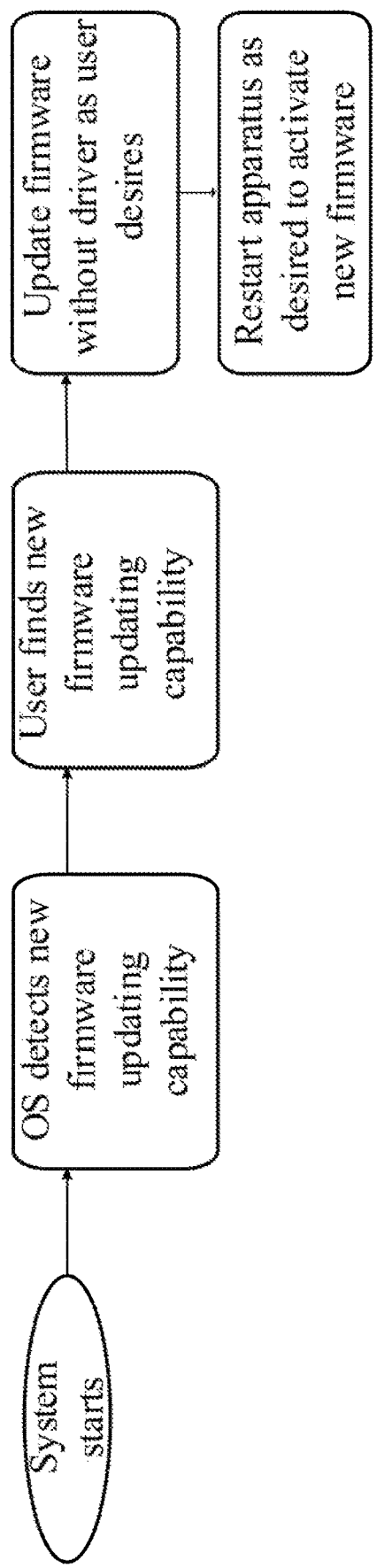
FIG. 12 is a flow chart II of a firmware updating for a first apparatus provided in an embodiment of the present disclosure.

In order to understand the above-described contents more intuitively, the firmware updating flow diagram shown in FIG. 12 may be referred to. In FIG. 12, the contained firmware updating flow is as follows.

Step 1, the data system 100 starts.
Herein, the system may be powered up.
Step 2, the operating system of the system detects whether the first apparatus has the firmware updating capability.
It is possible herein while the operating system is running, the host sends the lsPCI-x/-xxx/-xxxx command to the first apparatus to display the configuration spaces of the first apparatus and check whether the first apparatus has the firmware updating capability from the displayed configuration spaces; and if so, the host displays the firmware updating capability; and if not, the host does not display the firmware updating capability.

Step 3, the user finds the firmware updating capability.

Herein, when the first apparatus has the firmware updating capability, the user may view the firmware updating capability.

Step 4, the firmware is updated without driver as the user needs.

It is to be noted that specific updating steps have been described in detail above and will not be repeated.

Step 5, the first apparatus is restarted as desired to activate new firmware.

It is to be noted that what is described here is an optional activating manner and how to activate specifically has been described in detail above and will not be repeated.

In some embodiments, the first apparatus contains at least one of the following interfaces: PCI interface, PCI-X interface and PCIe interface.

It is to be noted that apparatuses of PCI interface, PCI-X interface and PCIe interface types have configuration spaces. Therefore, the first apparatus contains at least one of the following interfaces: PCI interface, PCI-X interface and PCIe interface.

In some embodiments, if the first apparatus has a plurality of functions and if firmware updating needs to be performed for each function, it is required to configure firmware updating capability in the configuration space corresponding to each function to prepare for subsequent firmware upgrading for each function.

With the firmware updating method provided in embodiments of the present disclosure, by defining new firmware updating capability in the configuration space of the first apparatus to implement updating of the first firmware with this firmware updating capability, it is possible to conveniently and quickly upgrade firmware without driving tools. And the firmware updating method provided in the present disclosure may be applied to different types of apparatuses with configuration spaces, thereby resulting in a certain degree of universality.

Figure 13:
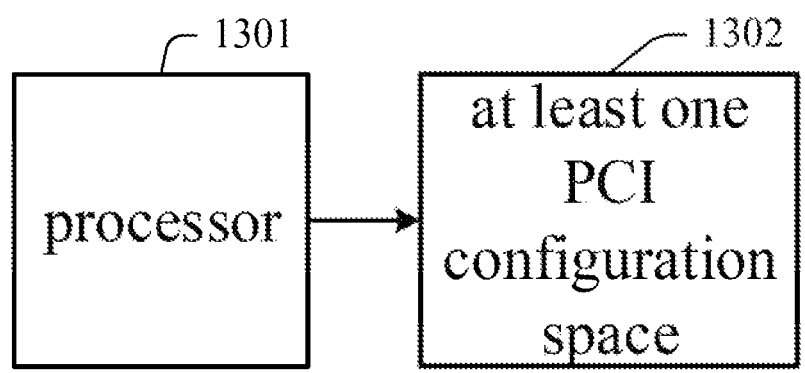
FIG. 13 is a structure diagram of a first apparatus provided in an embodiment of the present disclosure.

With the same inventive concept as above, as shown in FIG. 13, the present disclosure further provides a first apparatus 130 including a processor 1301 and at least one PCI configuration space 1302, wherein the processor is configured to configure firmware updating capability in the first PCI configuration space in the at least one PCI configuration space, and update the first firmware to the first apparatus based on the firmware updating capability.

It is to be noted that the processor herein refers to the processor in the first apparatus. It may be of the same type as or different type from the host processor. They are processors applied in different structures.

In some embodiments, the configuring firmware updating capability in the first PCI configuration space in the at least one PCI configuration space includes:

defining the first data structure corresponding to the firmware updating capability in the first PCI configuration space;

adding the firmware updating capability to the first capability chain table based on the first data structure to form the second capability chain table such that the firmware updating capability is configured in the first PCI configuration space;

wherein the first capability chain table is the chain table formed by capabilities already existing in the first PCI configuration space.

In some embodiments, the updating the first firmware to the first apparatus based on the firmware updating capability includes:

receiving one or more write commands containing data related to the first firmware;

writing the data related to the first firmware to the respective location in the first data structure;

upon receiving the update command, updating the first firmware to the respective storage region of the first apparatus based on the update command.

In some embodiments, the processor is further configured to receive a read command and feed back an identifier of successful updating of the first firmware based on the read command to indicate the completion of the updating of the first firmware.

In some embodiments, the processor is further configured to receive an activating command carrying the activating manner, and activate the first firmware based on the activating manner in the activating command.

In some embodiments, the first apparatus is coupled to a host; before configuring firmware updating capability in the first PCI configuration space in the at least one PCI configuration space, the processor is further configured to: use the operating system in the host coupled with itself to detect whether the firmware updating capability is configured in the first PCI configuration space.

In some embodiments, the using operating system in the host coupled with itself to detect whether the firmware updating capability is configured in the first PCI configuration space includes:

receiving a review command: executing the review command based on the operating system to obtain the configuration information of the at least one PCI configuration space contained in the first apparatus; and determining whether the firmware updating capability is configured in the first PCI configuration space based on the configuration information.

In some embodiments, the processor is configured to, once determining the first PCI configuration space has been configured with the firmware updating capability, directly update the first firmware to the first apparatus based on the firmware updating capability.

In some embodiments, the first apparatus communicates with the coupled host via at least one of the following interfaces: PCI interface. PCI-X interface and PCIe interface.

In some embodiments, the first apparatus is a storage terminal; or the first apparatus is a switch bridge.

In some embodiments, the storage terminal contains a memory system; wherein the memory system includes one or more memory devices; and a memory controller coupled on the one or more memory devices for controlling the one or more memory devices.

It is to be noted that the memory controller is a form of processor. That is, the processor will be a memory controller in the storage terminal.

In some embodiments, the memory device includes: a memory array containing a plurality of memory blocks; and a control circuit coupled to the memory array and for controlling the memory array.

In some embodiments, the memory array is a 3D NAND memory array.

It is to be noted that the first apparatus and the aforementioned firmware updating method belong to the same inventive concept and the first apparatus adopts the above-described method while handling firmware updating. Therefore, terms appear herein have been explained in detail in the above and apply equally herein, therefore will not be described any more.

Based on the same inventive concept as above, an embodiment of the present disclosure further provides a data system containing a host and a first apparatus; wherein the first apparatus contains at least one PCI configuration space for configuring functions for the first apparatus and communicates with the host via at least one of the following interfaces: PCI interface. PCI-X interface, and PCIe interface;

the host sends configuration request to the first apparatus;
the first apparatus receives the configuration request via the first interface and configures the firmware updating capability in the first PCI configuration space in the at least one PCI configuration space based on the configuration request; the first interface is one of PCI interface. PCI-X interface and PCIe interface;
the host sends one or more write commands containing data related to the first firmware to the first apparatus;
the first apparatus receives the one or more write commands via the first interface and writes data related to the first firmware to respective locations of the first data structure corresponding to the firmware updating capability; and upon receiving the update command, update the first firmware to the first apparatus based on the update command.

It is to be noted that the configuration request here is the afore-mentioned packet in TLP format.

In some embodiments, the host sends an activating command carrying the activating manner to the first apparatus;
the first apparatus receives the activating command carrying the activating manner via the first interface; and activates the first firmware based on the activating manner in the activating command.

In some embodiments, the first apparatus is a storage terminal; or the first apparatus is a switch bridge.

In some embodiments, the storage terminal contains a memory system; wherein the memory system includes one or more memory devices; and a memory controller coupled to the one or more memory devices and for controlling the one or more memory devices.

In some embodiments, the memory device includes: a memory array containing a plurality of memory blocks; and a control circuit coupled to the memory array and for controlling the memory array.

In some embodiments, the memory array is a 3D NAND memory array.

It is to be noted that the data system includes the afore-mentioned first apparatus and thus both of them have the same technical features. Terms appear in the data system have been explained in detail in the above-mentioned description of the first apparatus and apply equally herein, therefore will not be described any more.

The above description is intended to be illustrative rather than limiting. For example, the above-described examples (or one or more aspects thereof) may be used in combination with each other. Other embodiments may be used, such as those available for one of ordinary skill in the art upon reading the above description. It should be understood that it will not be used to interpret or limit the scope or meaning of the claims. Furthermore, in the above detailed description, various features may be combined to simplify the present disclosure. It should not be understood as meaning the disclosed features that have not been claimed are essential for any claims. To the contrary, the disclosed subject may lie in less than all features of specific disclosed embodiments. Accordingly, the appended claims are hereby incorporated in the detailed description, wherein each claim serves as a separate embodiment independently and it is contemplated these embodiments may be combined with each other in various combinations or permutations. The scope of the scope of the present disclosure should be determined by the full scope of the appended claims and equivalents accorded by these claims.

What is claimed is:

1. A firmware updating method being applied to a first apparatus with at least one PCI configuration space, the firmware updating method comprising:
    configuring firmware updating capability in a first PCI configuration space in the at least one PCI configuration space; and
    updating the first apparatus with a first firmware based on the firmware updating capability, wherein the configuring the firmware updating capability in the first PCI configuration space in the at least one PCI configuration space includes:
    defining a first data structure corresponding to the firmware updating capability in the first PCI configuration space; and
    adding the firmware updating capability to a first capability chain table based on the first data structure to form a second capability chain table such that the firmware updating capability is configured in the first PCI configuration space, wherein the first capability chain table is a chain table formed by capabilities already existing in the first PCI configuration space.

2. The firmware updating method of claim 1, wherein the updating the first apparatus with the first firmware based on the firmware updating capability comprises:
    receiving one or more write commands containing data related to the first firmware;
    writing the data related to the first firmware to respective locations of the first data structure; and
    upon receiving an update command, storing the first firmware to a respective storage region of the first apparatus based on the update command.

3. The firmware updating method of claim 2, wherein the firmware updating method further comprises:
    receiving a read command and feeding back an identifier of successful updating of the first firmware based on the read command to indicate a completion of the successful updating of the first firmware.

4. The firmware updating method of claim 1, wherein the firmware updating method further comprises:
    receiving an activating command carrying an activating manner; and
    activating the first firmware based on the activating manner in the activating command.

5. The firmware updating method of claim 1, wherein before the configuring the firmware updating capability in the first PCI configuration space in the at least one PCI configuration space, the firmware updating method further comprises:
    via an operating system in a host, detecting whether the firmware updating capability is configured in the first PCI configuration space.

6. The firmware updating method of claim 5, wherein the via the operating system in the host detecting whether the firmware updating capability is configured in the first PCI configuration space comprises:
    receiving a review command;

executing the review command based on the operating system to obtain a configuration information of the at least one PCI configuration space contained in the first apparatus; and determining whether the firmware updating capability is configured in the first PCI configuration space based on the configuration information of the at least one PCI configuration space contained in the first apparatus.

7. The firmware updating method of claim 6, wherein the firmware updating method further comprises:

once determining the firmware updating capability has been configured in the first PCI configuration space, directly updating the first firmware to the first apparatus based on the firmware updating capability.

8. The firmware updating method of claim 1, wherein the first apparatus contains at least one of the following interfaces:

PCI interface, PCI-X interface, or PCIe interface, to enable the first apparatus to communicate with a coupled host.

9. A first apparatus, comprising a processor and at least one PCI configuration space, wherein:

the processor is configured to configure firmware updating capability in a first PCI configuration space in the at least one PCI configuration space, and update the first apparatus with a first firmware based on the firmware updating capability, wherein the configuring the firmware updating capability in the first PCI configuration space in the at least one PCI configuration space includes:

defining a first data structure corresponding to the firmware updating capability in the first PCI configuration space; and adding the firmware updating capability to a first capability chain table based on the first data structure to form a second capability chain table such that the firmware updating capability is configured in the first PCI configuration space, wherein the first capability chain table is a chain table formed by capabilities already existing in the first PCI configuration space.

10. The first apparatus of claim 9, wherein the processor is further configured to:

receive an activating command carrying an activating manner; and activate the first firmware based on the activating manner in the activating command.

11. The first apparatus of claim 9, wherein the first apparatus is coupled to a host, and before configuring the firmware updating capability in the first PCI configuration space in the at least one PCI configuration space, the processor is further configured to:

use an operating system in the host coupled with itself to detect whether the firmware updating capability is configured in the first PCI configuration space.

12. The first apparatus of claim 11, wherein the using the operating system in the host coupled with itself to detect whether the firmware updating capability is configured in the first PCI configuration space comprises:

receiving a review command;

executing the review command based on the operating system to obtain a configuration information of the at least one PCI configuration space contained in the first apparatus; and determining whether the firmware updating capability is configured in the first PCI configuration space based on the configuration information of the at least one PCI configuration space contained in the first apparatus.

13. The first apparatus of claim 12, wherein the processor is further configured to, once determining the firmware updating capability has been configured in the first PCI configuration space, directly update the first firmware to the first apparatus based on the firmware updating capability.

14. The first apparatus of claim 9, wherein the first apparatus further comprises at least one of the following interfaces:

PCI interface, PCI-X interface, or PCIe interface, to enable the first apparatus to communicate with a coupled host.

15. The first apparatus of claim 14, wherein the first apparatus is a storage terminal, or the first apparatus is a switch bridge.

16. The first apparatus of claim 15, wherein the storage terminal contains a memory system, and the memory system comprises:

one or more memory devices; and a memory controller coupled to the one or more memory devices and controlling the one or more memory devices.

17. The first apparatus of claim 16, wherein one of the one or more memory devices comprises:

a memory array containing a plurality of memory blocks; and a control circuit coupled to the memory array and controlling the memory array.

18. The first apparatus of claim 17, wherein the memory array is a 3D NAND memory array.

19. A data system, comprising a host and a first apparatus, wherein the host and the first apparatus comprise a processor and are configured to interact with each other as follows:

the first apparatus contains at least one external component interconnect PCI configuration space and communicates with the host via at least one of the following interfaces: PCI interface, PCI-X interface, or PCIe interface;

the host sends a configuration request to the first apparatus;

the first apparatus receives the configuration request via a first interface and configures firmware updating capability in a first PCI configuration space in the at least one external component interconnect PCI configuration space based on the configuration request, wherein the first interface is one of PCI interface, PCI-X interface, and PCIe interface;

the host sends one or more write commands containing data related to a first firmware to the first apparatus; and the first apparatus receives the one or more write commands via the first interface and writes data related to the first firmware to respective locations of a first data structure corresponding to the firmware updating capability, and upon receiving an update command, update the first firmware to the first apparatus based on the update command.

* * * * *